United States Patent
Campbell et al.

(10) Patent No.: US 11,637,416 B2
(45) Date of Patent: Apr. 25, 2023

(54) CONDUCTOR TRIMMER SYSTEM

(71) Applicant: Southwire Company, LLC, Carrollton, GA (US)

(72) Inventors: Samuel Campbell, Carrollton, GA (US); Adlar Tuten, Carrollton, GA (US); Jason Ishoy, Villa Rica, GA (US); Lucas Cheney, Villa Rica, GA (US); Drew Pearson, Carrollton, GA (US); Casey Spradlin, Ranburne, AL (US); Steven Powers, Carrollton, GA (US); Charles L. Holcombe, Newnan, GA (US)

(73) Assignee: Southwire Company, LLC, Carrollton, GA (US)

( * ) Notice: Subject to any disclaimer, the term of this patent is extended or adjusted under 35 U.S.C. 154(b) by 55 days.

(21) Appl. No.: 17/027,067

(22) Filed: Sep. 21, 2020

(65) Prior Publication Data

US 2021/0104876 A1    Apr. 8, 2021

Related U.S. Application Data

(62) Division of application No. 15/498,622, filed on Apr. 27, 2017, now Pat. No. 10,784,661.

(60) Provisional application No. 62/328,122, filed on Apr. 27, 2016.

(51) Int. Cl.
  *H02G 1/02*  (2006.01)
  *H02G 1/00*  (2006.01)

(52) U.S. Cl.
  CPC ............... *H02G 1/005* (2013.01); *H02G 1/02* (2013.01)

(58) Field of Classification Search
  CPC .... H02G 1/005; H02G 1/1204; H02G 1/1212; H02G 1/1221; H02G 1/1236; H02G 1/1239; B23D 21/06; B23D 21/08; B23D 21/145; B26D 3/169; B25B 5/003
  USPC ........ 30/92–96, 98–102; 81/3.24, 90.2, 128; 269/3, 6, 152, 225, 239
  See application file for complete search history.

(56) References Cited

U.S. PATENT DOCUMENTS

| | | | | |
|---|---|---|---|---|
| 635,593 | A | * | 10/1899 | Ray et al. ............. B25B 13/463 81/128 |
| 760,128 | A | * | 5/1904 | Jackson ................ B23D 21/04 30/97 |
| 859,432 | A | * | 7/1907 | Charpier et al. ....... B23D 21/08 30/98 |

(Continued)

FOREIGN PATENT DOCUMENTS

| | | |
|---|---|---|
| EP | 2 724 820 B1 | 11/2019 |
| GB | 2503811 A | 8/2014 |
| WO | 2018/031796 A1 | 2/2018 |

*Primary Examiner* — Jason Daniel Prone
(74) *Attorney, Agent, or Firm* — Merchant & Gould P.C.

(57) ABSTRACT

A conductor trimmer may be provided. The conductor trimmer may include a grip and a trimmer. The grip may include a grip handle and a trimmer groove. The trimmer may include a trimmer handle. The trimmer may engage the trimmer groove. With trimmer snuggly attached to both the grip and a conductor, the trimmer may be rotated about conductor by a user holding the grip handle stationary and rotating the trimmer by the trimmer handle. As the trimmer rotates about the conductor, a first roller rail and a second roller rail may ride in the trimmer groove as a blade cuts layers of strands from the conductor.

8 Claims, 5 Drawing Sheets

(56) References Cited

U.S. PATENT DOCUMENTS

| | | | |
|---|---|---|---|
| 915,443 A * | 3/1909 | Jones | B25B 13/463 81/128 |
| 1,018,695 A | 2/1912 | Charpier et al. | |
| 1,279,022 A | 9/1918 | Scott | |
| 1,394,388 A | 10/1921 | Wisenberg | |
| 1,424,607 A | 8/1922 | Wisenberg | |
| 1,450,641 A | 4/1923 | Ograbisz | |
| 1,727,225 A | 9/1929 | Acres, Jr. | |
| 2,317,944 A | 4/1943 | Schaefer | |
| 2,877,549 A | 3/1959 | Landreth | |
| 2,884,826 A | 5/1959 | Bruhn | |
| 3,102,732 A | 9/1963 | Livermont | |
| 3,664,213 A | 5/1972 | Anati | |
| 3,672,050 A | 6/1972 | Hanback | |
| 4,114,266 A | 9/1978 | Erpenbeck | |
| D255,642 S | 7/1980 | Erpenbeck et al. | |
| 4,359,820 A | 11/1982 | Wheeler et al. | |
| 4,402,136 A | 9/1983 | Rast | |
| 4,436,004 A | 3/1984 | Chang | |
| 4,608,887 A | 9/1986 | Colvin | |
| 4,625,464 A | 12/1986 | Kubo | |
| 4,663,844 A | 5/1987 | Vegge | |
| 5,448,931 A | 9/1995 | Fossella et al. | |
| 5,515,609 A | 5/1996 | Sperti | |
| 5,956,853 A | 9/1999 | Watamura | |
| 6,073,522 A | 6/2000 | Carnesi | |
| 6,393,700 B1 | 5/2002 | Babb | |
| 6,671,962 B2 | 1/2004 | Watamura | |
| 7,478,577 B1 | 1/2009 | Wheeler | |
| 7,516,964 B2 | 4/2009 | Ubele et al. | |
| 7,721,629 B2 | 5/2010 | Shen et al. | |
| 7,934,317 B2 | 5/2011 | Chiu | |
| 8,033,024 B2 | 10/2011 | Goop | |
| 8,065,936 B2 | 11/2011 | Tutino | |
| 8,292,305 B2 | 10/2012 | Chen | |
| 8,833,209 B2 | 9/2014 | Brown | |
| 8,893,592 B2 | 11/2014 | Womack | |
| 9,136,677 B2 | 9/2015 | Ducret | |
| 10,784,661 B1 | 9/2020 | Campbell et al. | |
| 2002/0121173 A1 | 9/2002 | Filipo | |
| 2005/0097752 A1 | 5/2005 | Singer | |
| 2007/0000353 A1 | 1/2007 | Yu | |
| 2012/0079919 A1 | 4/2012 | Chen et al. | |
| 2014/0360317 A1 | 12/2014 | Chen | |
| 2015/0336284 A1 | 11/2015 | Munson et al. | |
| 2016/0114469 A1 | 4/2016 | Lai | |
| 2018/0297183 A1 | 10/2018 | Barzelay | |

\* cited by examiner

CONDUCTOR TRIMMER SYSTEM

RELATED APPLICATIONS

This application is a division of U.S. patent application Ser. No. 15/498,622, filed Apr. 27, 2017, now U.S. Pat. No. 10,784,661, which claims the benefit of U.S. Provisional Application No. 62/328,122 filed Apr. 27, 2016, the entire disclosures of both are incorporated herein by reference.

BACKGROUND

An overhead power line is a structure used in electric power transmission and distribution to transmit electrical energy along large distances. It consists of one or more conductors (commonly multiples of three) suspended by towers or poles. Since most of the insulation is provided by air, overhead power lines are generally the lowest-cost method of power transmission for large quantities of electric energy.

Towers for support of the lines are made of wood (as-grown or laminated), steel (either lattice structures or tubular poles), composite materials, and occasionally reinforced wood. The bare wire conductors on the line are generally made of aluminum or aluminum alloy (either plain or reinforced with steel, or composite materials such as carbon and glass fiber), though some copper wires are used in medium-voltage distribution and low-voltage connections to customer premises. A major goal of overhead power line design is to maintain adequate clearance between energized conductors and the ground so as to prevent dangerous contact with the line, and to provide reliable support for the conductors, resilient to storms, ice, and wind loads, earthquakes and other potential causes of damage.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
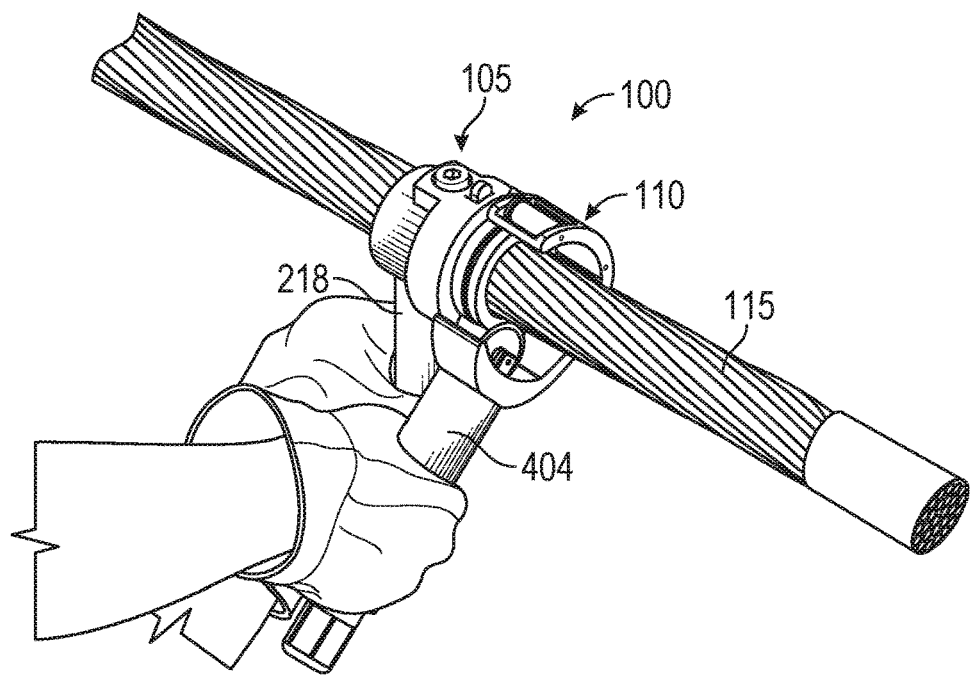
FIG. 1 shows a conductor trimmer system.

A conductor trimmer may be provided. The conductor trimmer may comprise a grip and a trimmer. The grip may comprise a grip handle and a trimmer groove. The trimmer may comprise a trimmer handle. The trimmer may be configured to engage the trimmer groove. With trimmer snuggly attached to both the grip and a conductor, the trimmer may be rotated about the conductor by a user holding the grip handle stationary and rotating the trimmer by the trimmer handle. As the trimmer rotates about the conductor, a first roller rail and a second roller rail may ride in the trimmer groove as a blade cuts layers of strands from the conductor.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A concentric-lay-stranded conductor is a term used to identify a conductor comprising a center core surrounded by one or more layers of helically wound conductor wires. The center core, for example, may be steel or a composite material. The conductor's "lay" may refer to the length and direction of strands in layers comprising the conductor. The lay length may comprise the axial length of one complete revolution of a helical strand. The lay direction may be defined as right-hand or left-hand, referring to the individual strands' wrap direction as viewed axially in a direction away from an observer. The conductor may comprise, for example, a homogeneous or a non-homogeneous material. Individual strands comprising the conductor may be, but not limited to, round or trapezoidal-shaped.

FIG. 1 shows a conductor trimmer system 100 consistent with embodiments of the disclosure. As shown in FIG. 1, conductor trimmer system 100 may comprise a grip 105 and a trimmer 110. As described in FIG. 2 below, grip 105 may comprise a grip body handle 218. As described in FIG. 4 below, trimmer 110 may comprise a trimmer handle 404. A conductor 115 (e.g., a concentric-lay-stranded conductor) may be passed through conductor trimmer system 100 with grip 105 and trimmer 110 interlocked with one another. Conductor 115 may include a first conductor layer, a second conductor layer, and a core. Conductor 115 may comprise any number of layers and is not limited to two. Second conductor layer may be helically wrapped around first conductor layer. First conductor layer may be helically wrapped around core. First conductor layer and second conductor layer may be wrapped in respective alternating hand lay. As will be discussed in greater detail below, conductor trimmer system 100 may be used to trim conductor layers from conductor 115 by rotating trimmer 110 about conductor 115 while gripping conductor 115 with grip 105.

Figure 2:
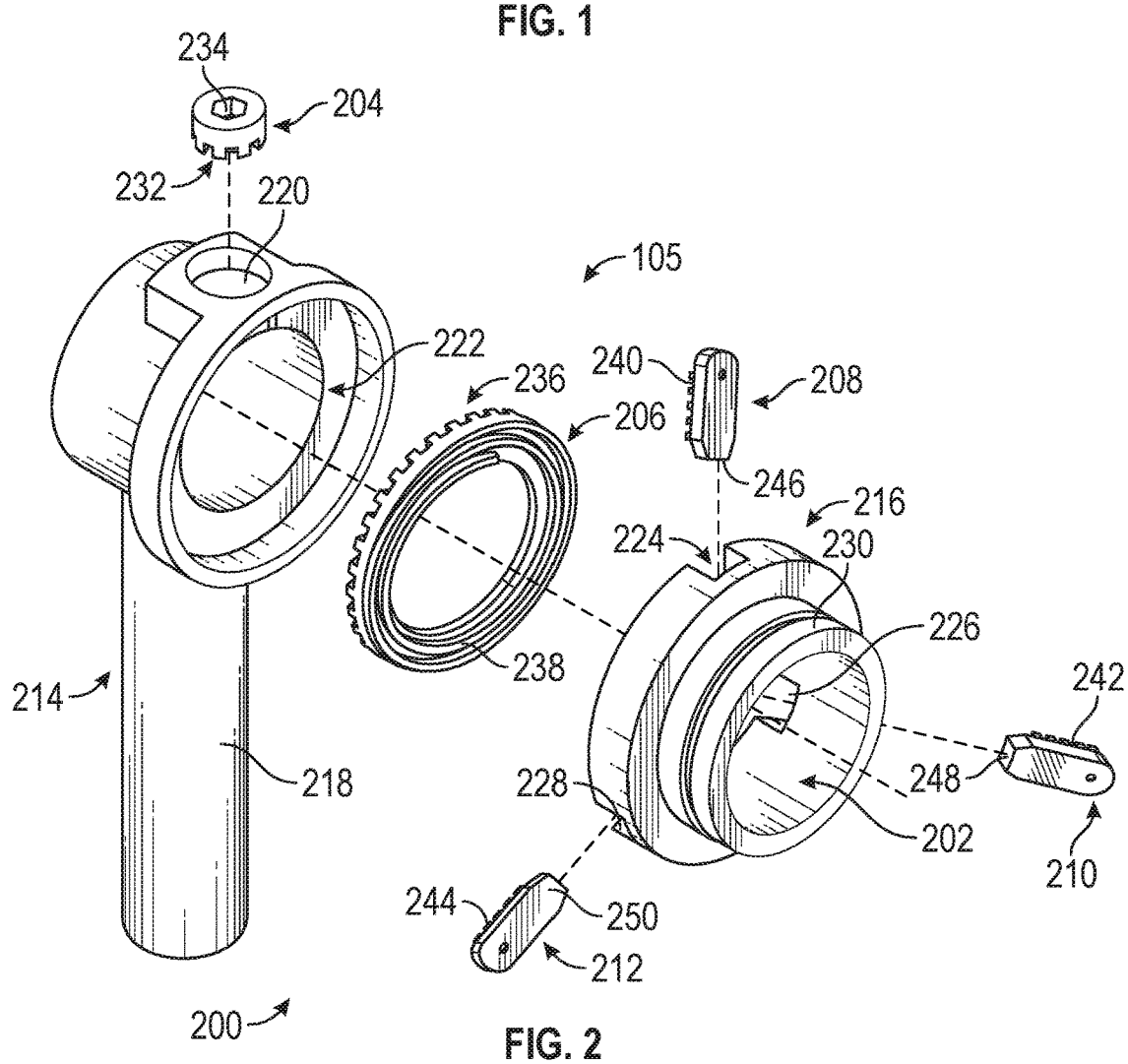
FIG. 2 shows a grip.

FIG. 2 shows grip 105 in greater detail. As shown in FIG. 2, grip 105 may comprise a grip body 200, a grip body opening 202, a drive gear 204, a scroll gear 206, a first jaw 208, a second jaw 210, and a third jaw 212. Grip body 200 may comprise a first grip body portion 214 and a second grip body portion 216. While FIG. 2 shows grip body 200 comprising two pieces (e.g., first grip body portion and second grip body portion), grip body 200 may be made of one piece and is not limited to comprising two pieces.

First grip body portion 214 may comprise grip body handle 218, a drive gear opening 220, and a scroll gear opening 222. Second grip body portion 216 may comprise a first jaw channel 224, a second jaw channel 226, a third jaw channel 228, and a trimmer groove 230. Consistent with embodiments of the disclosure, first grip body portion 214 may comprise a plurality of jaw channels similar to and corresponding to first jaw channel 224, second jaw channel 226, third jaw channel 228 of second grip body portion 216. Drive gear 204 may comprise a plurality of drive gear teeth 232 and a key opening 234. Scroll gear 206 may comprise a plurality of scroll gear teeth 236 and a scroll channel 238. First jaw 208 may comprise a plurality of first jaw teeth 240, second jaw 210 may comprise a plurality of second jaw teeth 242, and third jaw 212 may comprise a plurality of third jaw teeth 244. First jaw 208 may comprise a first jaw tip 246, second jaw 210 may comprise a second jaw tip 248, and third jaw 212 may comprise a third jaw tip 250.

Figure 3:
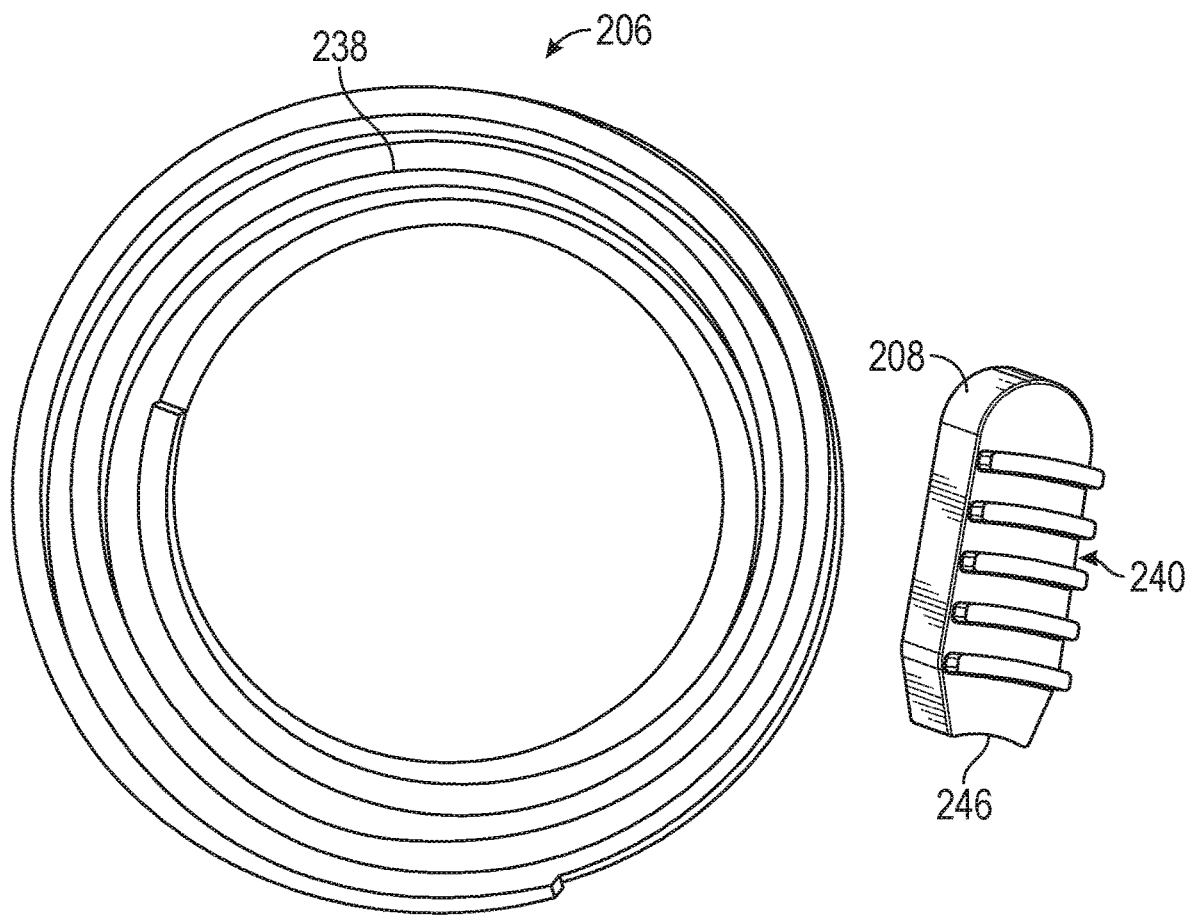
FIG. 3 shows a scroll gear and jaw.

FIG. 3 shows scroll gear 206 and first jaw 208 in greater detail. First jaw 208 with first jaw teeth 240 and first jaw tip 246 may be similar to second jaw 210 with second jaw teeth 242 and second jaw tip 248. Also, first jaw 208 with first jaw teeth 240 and first jaw tip 246 may be similar to third jaw 212 with third jaw teeth 244 and third jaw tip 250.

When grip 105 is assembled, plurality of drive gear teeth 232 engage plurality of scroll gear teeth 236. When a key (e.g., a hex wrench) is inserted into key opening 234 and rotated, this may cause a corresponding rotation drive gear 204 in drive gear opening 220. Because plurality of drive gear teeth 232 engage plurality of scroll gear teeth 236, the rotation of drive gear 204 may cause a corresponding rotation of scroll gear 206 in scroll gear opening 222.

Plurality of first jaw teeth 240 of first jaw 208 may engage scroll channel 238 of scroll gear 206. Similarly, plurality of second jaw teeth 242 of second jaw 210 may engage scroll channel 238 of scroll gear 206 and plurality of third jaw teeth 244 of third jaw 212 may engage scroll channel 238 of scroll gear 206. Accordingly, the rotation of scroll gear 206, in scroll gear opening 222, may cause first jaw 208, second jaw 210, and third jaw 212 to correspondingly move linearly in first jaw channel 224, second jaw channel 226, and third jaw channel 228, respectively. Similarly, first jaw 208, second jaw 210, and third jaw 212 may correspondingly move linearly in the plurality of jaw channels of first grip body portion 214.

As will be described in greater detail below, conductor 115 may be placed in grip body opening 202. Once conductor 115 is placed in grip body opening 202, drive gear 204 may be rotated. As drive gear 204 is rotated in a first direction (e.g., clockwise), first jaw 208, second jaw 210, and third jaw 212 may all synchronously move toward the center of grip body opening 202 at the same rate and distance. Drive gear 204 may be rotated until first jaw tip 246, second jaw tip 248, and third jaw tip 250 all fit snuggly against conductor 115. As drive gear 204 is rotated in a second direction (e.g., counterclockwise), first jaw 208, second jaw 210, and third jaw 212 may all synchronously move away from the center of grip body opening 202 at the same rate and distance.

Figure 4:
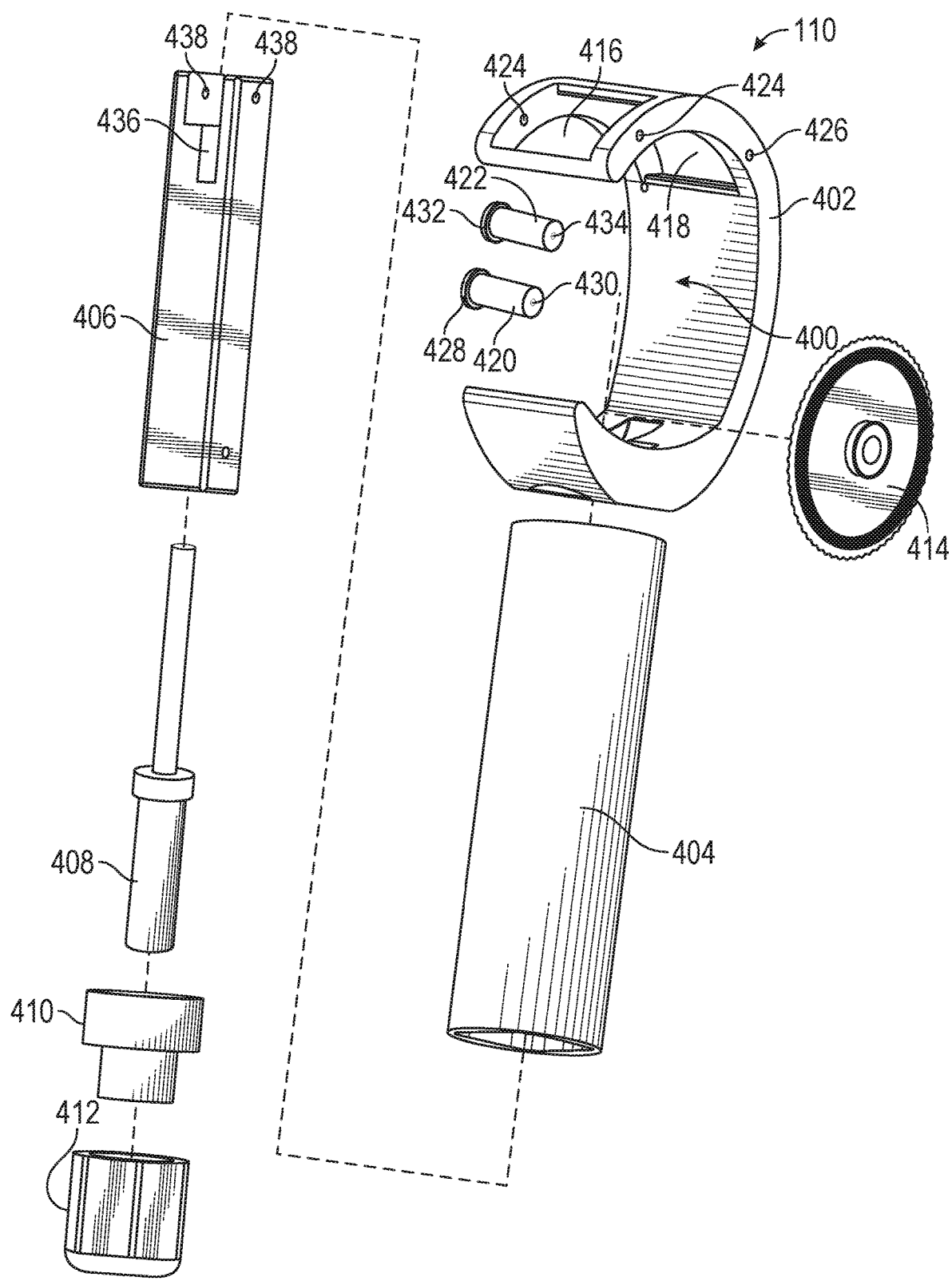
FIG. 4 shows a trimmer.

FIG. 4 shows trimmer 110 greater detail. As shown in FIG. 4, trimmer 110 may comprise a trimmer opening 400, a trimmer head 402, trimmer handle 404, a blade column 406, an inverted screw 408, a blade stabilizer 410, a trimmer handle end 412, and a blade 414. Blade 414 may comprise a plurality of teeth, for example, on an outer edge of blade 414. Trimmer head 402 may comprise a first roller opening 416, a second roller opening 418, a first roller 420, and a second roller 422. First roller opening 416 may comprise first roller opening holes 424 and second roller opening 418 may comprise second roller opening holes 426. First roller 420 may comprise a first roller rail 428 and a first roller hole 430. Second roller 422 may comprise a second roller rail 432 and a second roller hole 434. Blade column 406 may comprise a blade opening 436 and blade column holes 438.

First roller 420 may be placed in first roller opening 416. A first fastener (e.g., a pin) may be placed through first roller opening holes 424 and first roller hole 430 to hold first roller 420 in first roller opening 416. First roller 420 may freely rotate about the first fastener. Similarly, second roller 422 may be placed in second roller opening 418. A second fastener (e.g., a pin) may be placed through second roller opening holes 426 and second roller hole 434 to hold second roller 422 in second roller opening 418. Second roller 422 may freely rotate about the second fastener.

Blade 414 may be held in blade opening 436 of blade column 406 by a blade fastener (e.g., a pin) passing through a center of blade 414 and blade column holes 438. Blade 414 may freely rotate in blade opening 436 and about the blade fastener.

Blade column 406, inverted screw 408, and blade stabilizer 410 may be placed in trimmer handle 404. Blade stabilizer 410 may be fastened to the interior of trimmer handle 404. Blade column 406 may be free to slide up and down the inside of trimmer handle 404. Blade stabilizer 410 may hold inverted screw 408 in place, but allowing it to freely rotate. A first end of inverted screw 408 may screw into blade column 406 and a second end of inverted screw 408 may be attached to trimmer handle end 412. As trimmer handle end 412 is rotated in a first direction (e.g., clockwise), inverted screw 408 may be correspondingly rotated to force blade column 406 to slide up the interior of trimmer handle 404 toward trimmer head 402. Similarly, as trimmer handle end 412 is rotated in a second direction (e.g., counterclockwise), inverted screw 408 may be correspondingly rotated to force blade column 406 to slide down the interior of trimmer handle 404 away from trimmer head 402.

Figure 5:
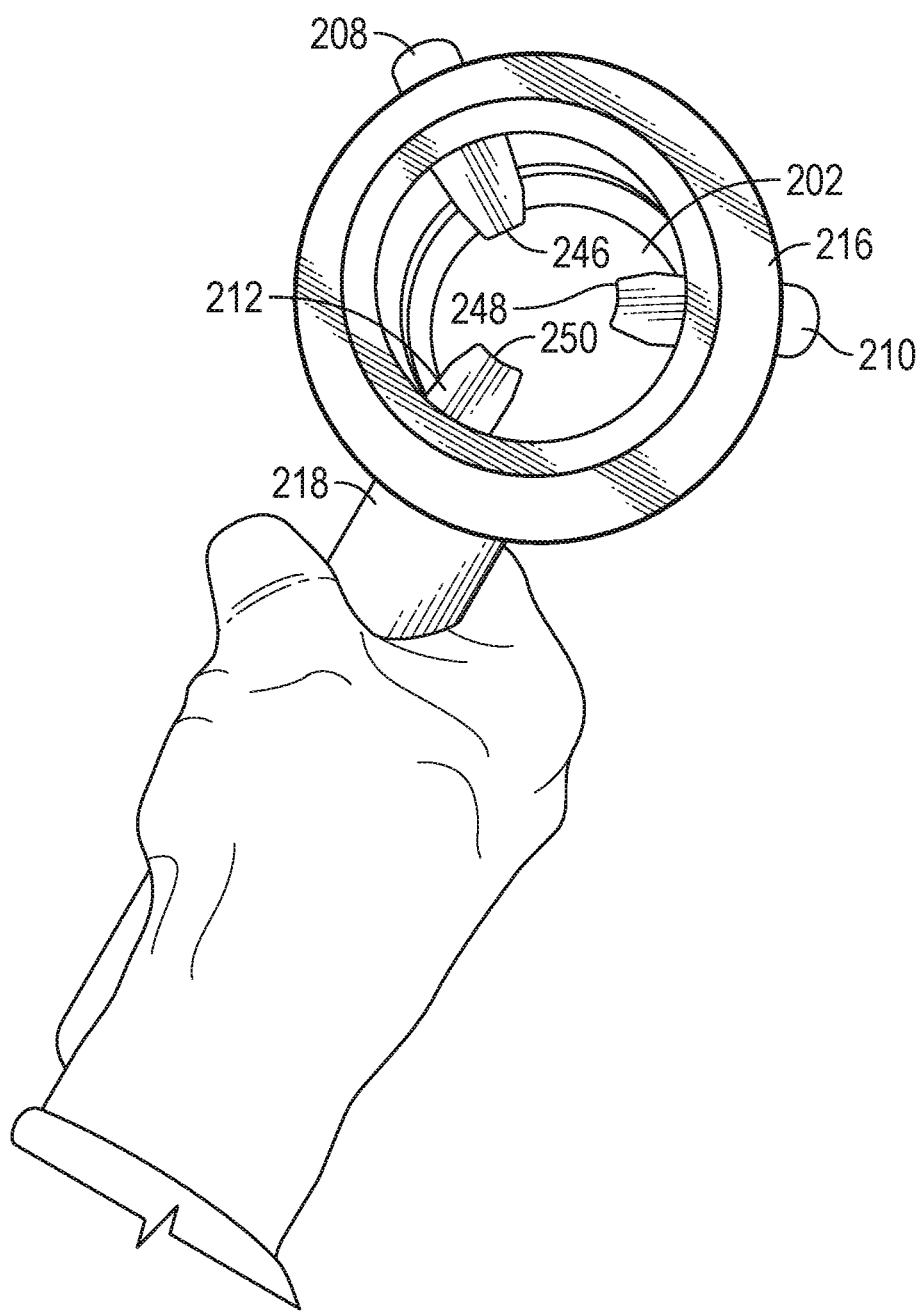
FIG. 5 shows a grip.

Next, the operation of conductor trimmer system 100 may be described. As shown in FIG. 5, a user may take grip 105 by grip body handle 218 and insert conductor 115 into grip body opening 202. Once conductor 115 is placed in grip body opening 202, the user may place a key (e.g., a hex wrench) into key opening 234 and rotate the key. Rotating the key may cause a corresponding rotation of drive gear 204. As described above, as drive gear 204 is rotated in a first direction (e.g., clockwise), first jaw 208, second jaw 210, and third jaw 212 may all synchronously move toward the center of grip body opening 202 at the same rate and distance. Drive gear 204 may be rotated until first jaw tip 246, second jaw tip 248, and third jaw tip 250 all fit snuggly against conductor 115. Accordingly, grip 105 may be snuggly attached to conductor 115.

Next, a user may take trimmer 110 by trimmer handle 404. Conductor 115 may be placed in trimmer opening 400 as shown in FIG. 1. First roller rail 428 and second roller rail 432 may be placed in trimmer groove 230. While first roller rail 428 and second roller rail 432 are in trimmer groove 230, trimmer handle end 412 may be rotated. Trimmer handle end 412 may be rotated until first roller 420, second roller 422, and blade 414 are snuggly against conductor 115. Accordingly, trimmer 110 may be snuggly attached to both grip 105 and conductor 115.

With trimmer 110 snuggly attached to both grip 105 and conductor 115, trimmer 110 may be rotated about conductor 115. In order to rotate trimmer 110 about conductor 115, the user may use one hand to hold grip body handle 218 and may use the other hand to hold trimmer handle 404. Consequently, grip body handle 218 may be used to stabilize conductor 115 as trimmer handle 404 is used to rotate trimmer 110 about conductor 115. As trimmer 110 rotates about conductor 115, first roller rail 428 and second roller rail 432 may ride in trimmer groove 230 as blade 414 cuts a layer of strands from conductor 115. As the layer of strands is cut from conductor 115, trimmer handle end 412 may be rotated to adjust blade 414 against a subsequent layer of strands of conductor 115. In this way, one user may trim conductor 115 because conductor trimmer system 100 may allow conductor 115 to be gripped and stabilized with one hand (e.g., using grip body handle 218) while the other hand trims conductor 115 (e.g., using trimmer handle 404).

Figure 6:
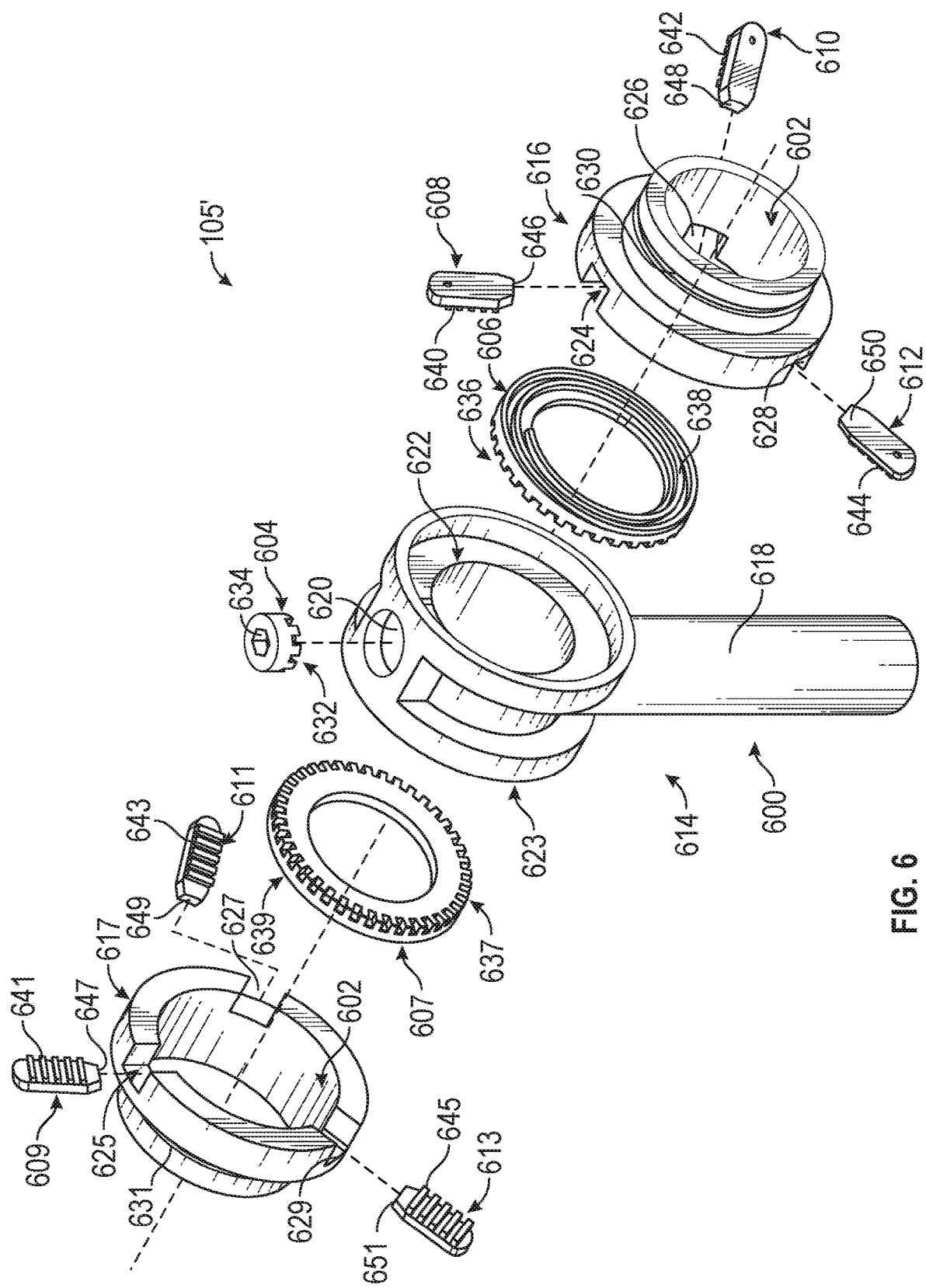
FIG. 6 shows a grip.

FIG. 6 shows grip 105' that may comprise another embodiment of grip 105. As shown in FIG. 6, grip 105' may comprise a grip body 600, a grip body opening 602, a drive gear 604, an anterior scroll gear 606, an anterior first jaw 608, an anterior second jaw 610, and an anterior third jaw 612. Grip 105' may further comprise a posterior scroll gear 607, a posterior first jaw 609, a posterior second jaw 611, and a posterior third jaw 613. Grip body 600 may comprise a main grip body portion 614, an anterior grip body portion 616, and a posterior grip body portion 617.

While FIG. 6 shows grip body 600 comprising three pieces (e.g., main grip body portion 614, anterior grip body portion 616, and posterior grip body portion 617), grip body 600 may be made of one piece and is not limited to comprising three pieces. Also, while FIG. 6 shows anterior first jaw 608, anterior second jaw 610, and anterior third jaw 612 being in line with posterior first jaw 609, posterior second jaw 611, and an posterior third jaw 613, posterior grip body portion 617 may be rotated about an axis passing through grip body opening 602. For example, anterior first jaw 608, anterior second jaw 610, and anterior third jaw 612 may be 60 degrees out of line with posterior first jaw 609, posterior second jaw 611, and a posterior third jaw 613.

Main grip body portion 614 may comprise a grip body handle 618, a drive gear opening 620, an anterior scroll gear opening 622, and a posterior scroll gear opening 623. Anterior grip body portion 616 may comprise an anterior first jaw channel 624, an anterior second jaw channel 626, an anterior third jaw channel 628, and an anterior trimmer groove 630. Posterior grip body portion 617 may comprise a posterior first jaw channel 625, a posterior second jaw channel 627, a posterior third jaw channel 629, and a posterior trimmer groove 631. Posterior trimmer groove 631 may be optional. Consistent with embodiments of the disclosure, main grip body portion 614 may comprise a plurality of anterior jaw channels similar to and corresponding to anterior first jaw channel 624, anterior second jaw channel 626, and anterior third jaw channel 628 of anterior grip body portion 616. Similarly, main grip body portion 614 may comprise a plurality of posterior jaw channels similar to and corresponding to posterior first jaw channel 625, posterior second jaw channel 627, and posterior third jaw channel 629 of posterior grip body portion 617.

Drive gear 604 may comprise a plurality of drive gear teeth 632 and a key opening 634. Anterior scroll gear 606 may comprise a plurality of anterior scroll gear teeth 636 and an anterior scroll channel 638. Anterior first jaw 608 may comprise a plurality of anterior first jaw teeth 640, anterior second jaw 610 may comprise a plurality of anterior second jaw teeth 642, and anterior third jaw 612 may comprise a plurality of anterior third jaw teeth 644. Anterior first jaw 608 may comprise an anterior first jaw tip 646, anterior second jaw 610 may comprise an anterior second jaw tip 648, and anterior third jaw 612 may comprise an anterior third jaw tip 650. Posterior scroll gear 607 may comprise a plurality of posterior scroll gear teeth 637 and a posterior scroll channel 639. Posterior first jaw 609 may comprise a plurality of posterior first jaw teeth 641, posterior second jaw 611 may comprise a plurality of posterior second jaw teeth 643, and posterior third jaw 613 may comprise a plurality of posterior third jaw teeth 645. Posterior first jaw 609 may comprise a posterior first jaw tip 647, posterior second jaw 611 may comprise a posterior second jaw tip 649, and posterior third jaw 613 may comprise a posterior third jaw tip 651.

When grip 105' is assembled, plurality of drive gear teeth 632 engage plurality of anterior scroll gear teeth 636 and plurality of posterior scroll gear teeth 637. When a key (e.g., a hex wrench) is inserted into key opening 634 and rotated, this may cause a corresponding rotation of drive gear 604 in drive gear opening 620. Because plurality of drive gear teeth 632 engage plurality of anterior scroll gear teeth 636 and plurality of posterior scroll gear teeth 637, the rotation of drive gear 604 may cause a corresponding rotation of anterior scroll gear 606 in anterior scroll gear opening 622 and posterior scroll gear 607 in posterior scroll gear opening 623.

Plurality of anterior first jaw teeth 640 of anterior first jaw 608 may engage anterior scroll channel 638 of anterior scroll gear 606. Similarly, plurality of anterior second jaw teeth 642 of anterior second jaw 610 may engage anterior scroll channel 638 of anterior scroll gear 606 and plurality of anterior third jaw teeth 644 of anterior third jaw 612 may engage anterior scroll channel 638 of anterior scroll gear 606. Accordingly, the rotation of anterior scroll gear 606, in anterior scroll gear opening 622, may cause anterior first jaw 608, anterior second jaw 610, and anterior third jaw 612 to correspondingly move linearly in anterior first jaw channel 624, anterior second jaw channel 626, and anterior third jaw channel 628, respectively. Similarly, anterior first jaw 608, anterior second jaw 610, and anterior third jaw 612 may correspondingly move linearly in the plurality of anterior jaw channels of main grip body portion 614.

Plurality of posterior first jaw teeth 641 of posterior first jaw 609 may engage posterior scroll channel 639 of posterior scroll gear 607. Similarly, plurality of posterior second jaw teeth 643 of posterior second jaw 611 may engage posterior scroll channel 639 of posterior scroll gear 607 and plurality of posterior third jaw teeth 645 of posterior third jaw 613 may engage posterior scroll channel 639 of posterior scroll gear 607. Accordingly, the rotation of posterior scroll gear 607, in posterior scroll gear opening 623, may cause posterior first jaw 609, posterior second jaw 611, and posterior third jaw 613 to correspondingly move linearly in posterior first jaw channel 625, posterior second jaw channel 627, and posterior third jaw channel 629, respectively. Similarly, posterior first jaw 609, posterior second jaw 611, and posterior third jaw 613 may correspondingly move linearly in the plurality of posterior jaw channels of main grip body portion 614.

As described above, conductor 115 may be placed in grip body opening 602. Once conductor 115 is placed in grip body opening 602, drive gear 604 may be rotated. As drive gear 604 is rotated in a first direction (e.g., clockwise), anterior first jaw 608, anterior second jaw 610, anterior third jaw 612, posterior first jaw 609, posterior second jaw 611, and posterior third jaw 613 may all synchronously move toward the center of grip body opening 602 at the same rate and distance. Drive gear 604 may be rotated until anterior first jaw tip 646, anterior second jaw tip 648, anterior third jaw tip 650, posterior first jaw tip 647, posterior second jaw tip 649, and posterior third jaw tip 651 all fit snuggly against conductor 115. As drive gear 604 is rotated in a second direction (e.g., counterclockwise), anterior first jaw 608, anterior second jaw 610, anterior third jaw 612, posterior first jaw 609, posterior second jaw 611, and posterior third jaw 613 may all synchronously move away from the center of grip body opening 602 at the same rate and distance.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A system comprising:
   a main grip body portion comprising;
      a drive gear opening,
      an anterior scroll gear opening, and
      a posterior scroll gear opening;
   an anterior grip body portion comprising;
      an anterior first jaw channel in which is slideably disposed an anterior first jaw comprising a plurality of anterior first jaw teeth,
      an anterior second jaw channel in which is slideably disposed an anterior second jaw comprising a plurality of anterior second jaw teeth,
      an anterior third jaw channel in which is slideably disposed an anterior third jaw comprising a plurality of anterior third jaw teeth, and
      an anterior trimmer groove;
   a posterior grip body portion comprising;
      a posterior first jaw channel in which is slideably disposed a posterior first jaw comprising a plurality of posterior first jaw teeth,
      a posterior second jaw channel in which is slideably disposed a posterior second jaw comprising a plurality of posterior second jaw teeth, and
      a posterior third jaw channel in which is slideably disposed a posterior third jaw comprising a plurality of posterior third jaw teeth;
   an anterior scroll gear rotatable disposed in the anterior scroll gear opening between the main grip body portion and the anterior grip body portion, the anterior scroll gear comprising;
      a plurality of anterior scroll gear teeth, and
      an anterior scroll channel that drives the plurality of anterior first jaw teeth, the plurality of anterior second jaw teeth, and the plurality of anterior third jaw teeth;
   a posterior scroll gear rotatable disposed in the posterior scroll gear opening between the main grip body portion and the posterior grip body portion, the posterior scroll gear comprising;
      a plurality of posterior scroll gear teeth, and
      a posterior scroll channel that drives the plurality of posterior first jaw teeth, the plurality of posterior second jaw teeth, and the plurality of posterior third jaw teeth;
   a drive gear rotatably disposed in the drive gear opening, the drive gear comprising;
      a plurality of drive gear teeth that drive the plurality of anterior scroll gear teeth and the plurality of posterior scroll gear teeth, and
      a key opening;
   a grip body opening passing through the main grip body portion, the anterior grip body portion, the posterior grip body portion, the anterior scroll gear, and the posterior scroll gear; and
   a grip body handle attached to the main grip body portion.

2. The system of claim 1, further comprising a trimmer rotatably engaged to the anterior trimmer groove.

3. The system of claim 2, wherein the trimmer comprises a trimmer handle.

4. The system of claim 3, wherein the trimmer rotates within the anterior trimmer groove in response to opposing forces being placed on the grip body handle and the trimmer handle.

5. The system of claim 1, further comprising a trimmer having a first roller rail and a second roller rail, wherein the first roller rail and the second roller rail engage the anterior trimmer groove.

6. The system of claim 1, wherein the posterior grip body portion further comprising a posterior trimmer groove.

7. The system of claim 1, wherein the anterior first jaw further comprises an anterior first jaw tip disposed in the grip body opening, wherein the anterior second jaw further comprises an anterior second jaw tip disposed in the grip body opening, and wherein the anterior third jaw further comprises an anterior third jaw tip disposed in the grip body opening.

8. The system of claim 1, wherein the posterior first jaw further comprises a posterior first jaw tip disposed in the grip body opening, wherein the posterior second jaw further comprises a posterior second jaw tip disposed in the grip body opening, and wherein the posterior third jaw further comprises a posterior third jaw tip disposed in the grip body opening.

* * * * *